United States Patent [19]

Meek et al.

[11] 4,172,353

[45] Oct. 30, 1979

[54] HARVESTING MACHINE

[75] Inventors: Nigel W. Meek; John Robb, both of Aylesbury, England

[73] Assignee: Sperry Rand Corporation, New Holland, Pa.

[21] Appl. No.: 890,092

[22] Filed: Mar. 27, 1978

[30] Foreign Application Priority Data

Apr. 5, 1977 [GB] United Kingdom ............... 14225/77

[51] Int. Cl.² .......................................... A01D 43/10
[52] U.S. Cl. .................................. 56/14.4; 56/DIG. 1
[58] Field of Search ............. 56/192, 6, DIG. 1, 14.4, 56/15.8

[56] References Cited

U.S. PATENT DOCUMENTS

| 3,389,539 | 6/1968 | Zweegers | 56/6 |
| 3,979,889 | 9/1976 | Vansteelant | 56/53 |

FOREIGN PATENT DOCUMENTS

| 2131598 | 12/1972 | Fed. Rep. of Germany | 56/14.4 |
| 2517816 | 10/1975 | Fed. Rep. of Germany | 56/14.4 |
| 6703899 | 2/1968 | Netherlands | 56/6 |
| 1143663 | 2/1969 | United Kingdom | 56/192 |

*Primary Examiner*—Russell R. Kinsey
*Attorney, Agent, or Firm*—John B. Mitchell; Frank A. Seemar; Ralph D'Alessandro

[57] ABSTRACT

A mower-conditioner for agricultural use employing one or more rotatably mounted drum type cutter units, each of which supports at least one cutter blade for cutting standing crop by impact under conditions where the drums are rotated about generally upright axes. A frame assembly is provided on which a crop conditioner is mounted for receiving severed crop material as it is being conveyed rearwardly by the cutter units.

5 Claims, 9 Drawing Figures

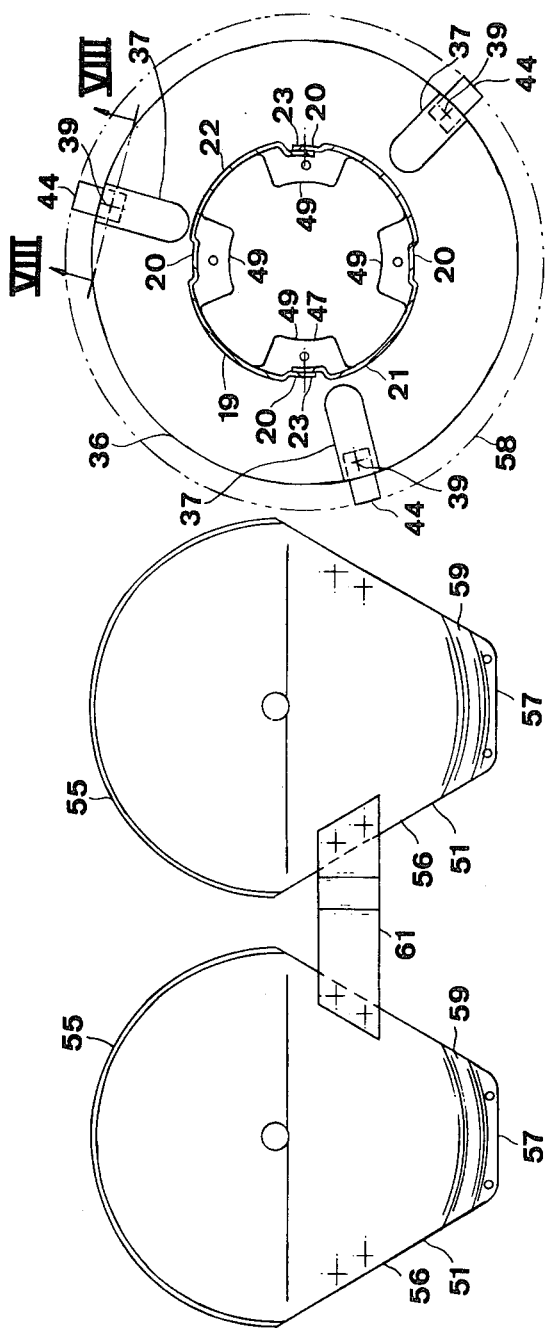

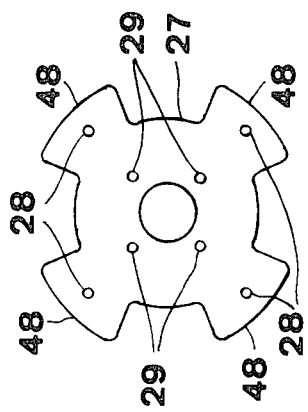
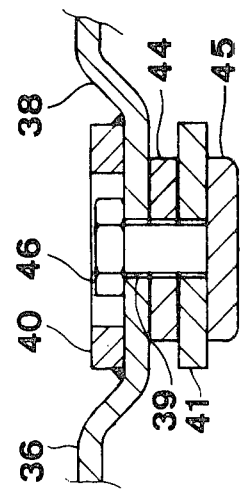
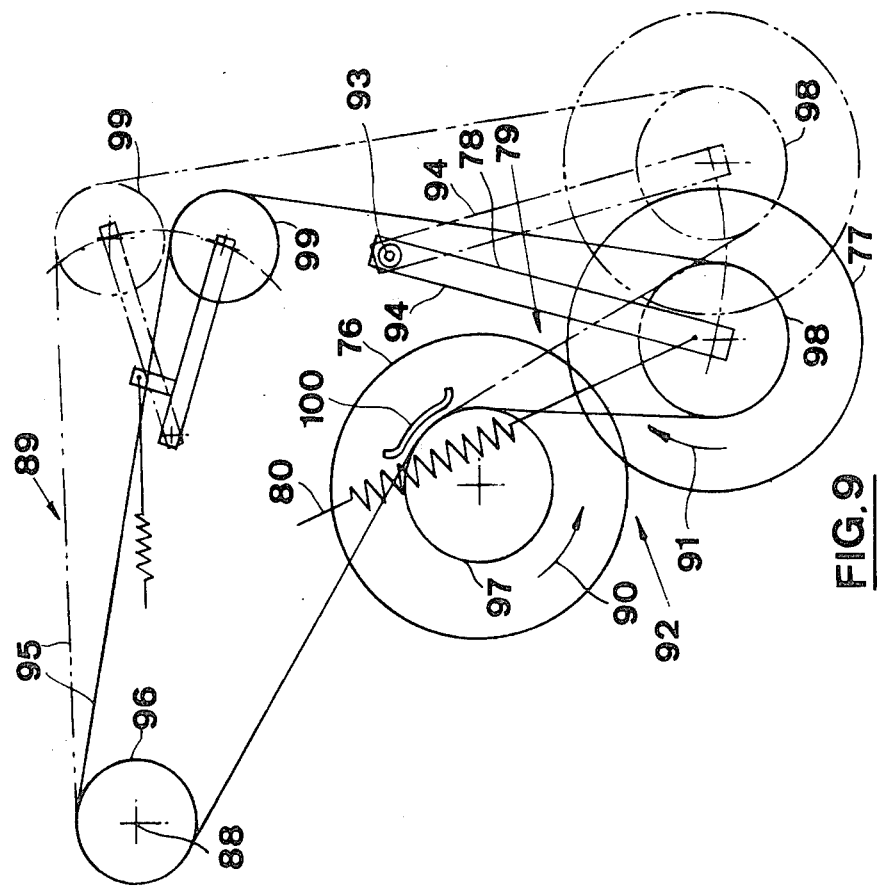

HARVESTING MACHINE

BACKGROUND OF THE INVENTION

In drum type rotary mowers currently in use the rotatable drum cutter units comprise cylindrical bodies mounted beneath a transversely-extending main beam and having annular flanges at their lower ends for pivotally supporting cutter blades. These cutter units are driven from the top and, therefore, the drive means may be arranged inside the main beam. At the lower end, ground-engaging supports are normally arranged underneath each of the cutting units for supporting the structure on the ground. These ground-engaging supports may be stationary units or may be freely rotatable. Crop engaging and discharging ribs may protect from the upper side of the flanges and/or the outer circumference of the cylindrical body portions. The drums normally are driven at a very high speed such as in the range of 2000 to 2500 r.p.m. Exemplary of this type of mower are the machine shown in U.S. Pat. No. 3,389,539 issued on June 25, 1968, and U.S. Pat. No. 3,443,369 issued on May 13, 1969.

Drum mowers are generally well accepted because in certain crop conditions their capacity is considerably larger than that of conventional reciprocating mowers, i.e., drum mowers cut some types of crops which are difficult to cut with conventional mowers. Another advantage is that cut crop is normally fluently conveyed in a rearward direction and discharged through the gap between neighboring drums in a well-defined windrow.

As is also known, a conditioner may be attached to a drum mower of the above type. For example, see U.S. Pat. No. 3,751,889 issued on Aug. 14, 1973, and U.S. Pat. No. 3,896,609 issued on July 29, 1975. However, in these known arrangements, the conditioner is cantilevered from the main beam of the mower structure. This arrangement may cause high stresses in critical areas and may also require a drive system of a relatively complicated nature.

SUMMARY OF THE INVENTION

It is the principal object of the present invention to provide an improved harvesting machine and to overcome or attenuate the aforementioned disadvantages of rotary drum type mower conditioners.

According to the present invention, a mower-conditioner comprises one or more drum type mower units mounted between an upper transverse beam and respective stationary ground-engageable skids associated with each of the units. Crop conditioner means are mounted rearwardly of the mower units and between the upper beam and rear portions of the skids.

The upper transverse beam in a preferred embodiment may carry a gearbox at one end, the gearbox having an input shaft connectable to drive means, a first output shaft operable to drive the mower units through a belt drive arrangement, and a second output shaft operable to drive the conditioner means through a chain drive arrangement. Each mower unit generally comprises a cylindrical body and a lower flange attached thereto.

It is preferable to provide at least one pair of counter-rotating mower units. With this arrangement the conditioner means is mounted in a sub-frame comprising side walls attached to the respective rear ends of the skids of the mower units and attached to the upper transverse beam via extensions interconnecting the side walls and the upper beam. The conditioner means is in the form of a pair of generally horizontal, intermeshing rolls one of which is mounted for pivotal movement towards and away from the other. The pivot axis of said one roll is defined by a torsion bar the ends of which are attached to ends of arms the other ends of which are connected to respective ends of said one roll, means being provided to urge said one roll towards the other roll. If crop material is fed unevenly to the conditioner means whereby said one roll is moved away from the other roll more at one end than the other, the torsion bar operates to move the other end of the roll so as to maintain the two rolls substantially parallel.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

BRIEF DESCRIPTION OF THE DRAWINGS

A mower-conditioner in accordance with the present invention will now be described in greater detail, by way of example, with reference to the accompanying drawings, in which:

FIG. 5 is a plan view of certain components of FIG. 4;

FIG. 6 is a section on the line VI—VI of FIG. 4 with certain components removed for clarity;

FIG. 7 is a plan view of component designated by the numeral VII in FIG. 4;

FIG. 8 is a section on the line VIII—VIII of FIG. 6; and

FIG. 9 is a schematic view taken generally in the direction of arrow IX in FIG. 2;

DETAILED DESCRIPTION OF THE PREFERRED EMBODIMENT

Figure 1:
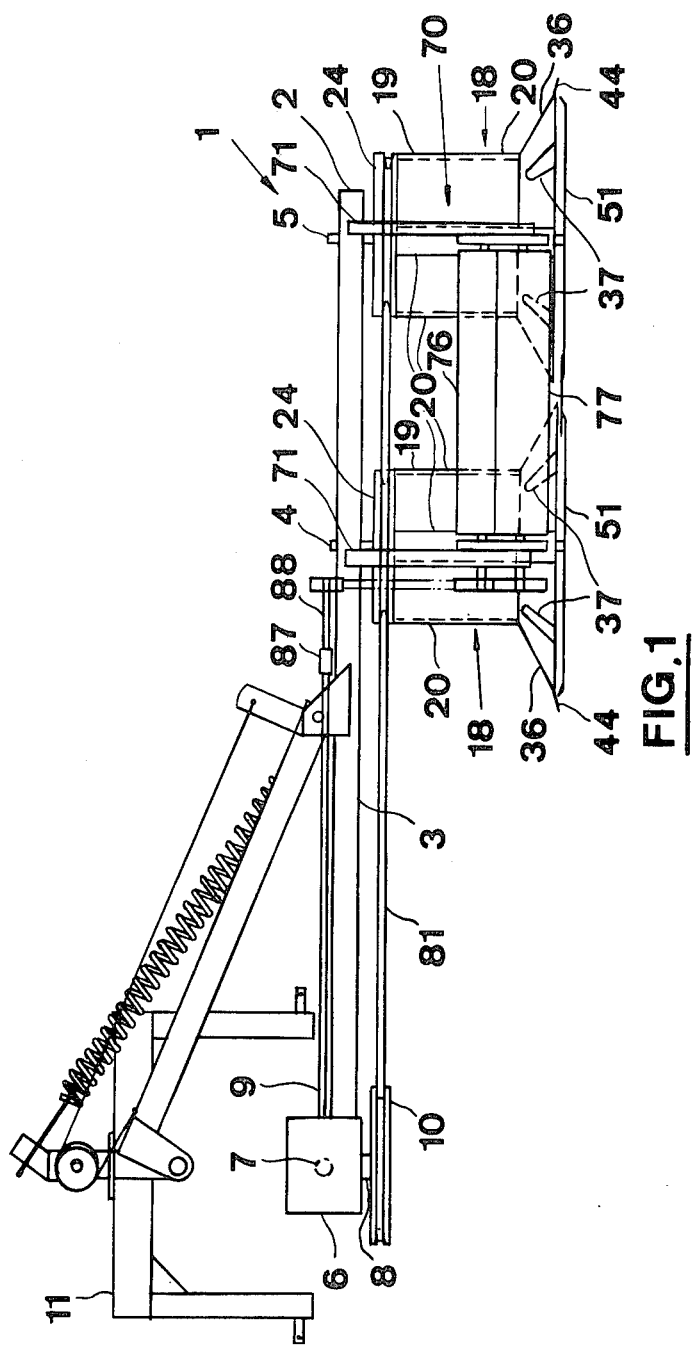
FIG. 1 is a rear view of the mower-conditioner.
Figure 2:
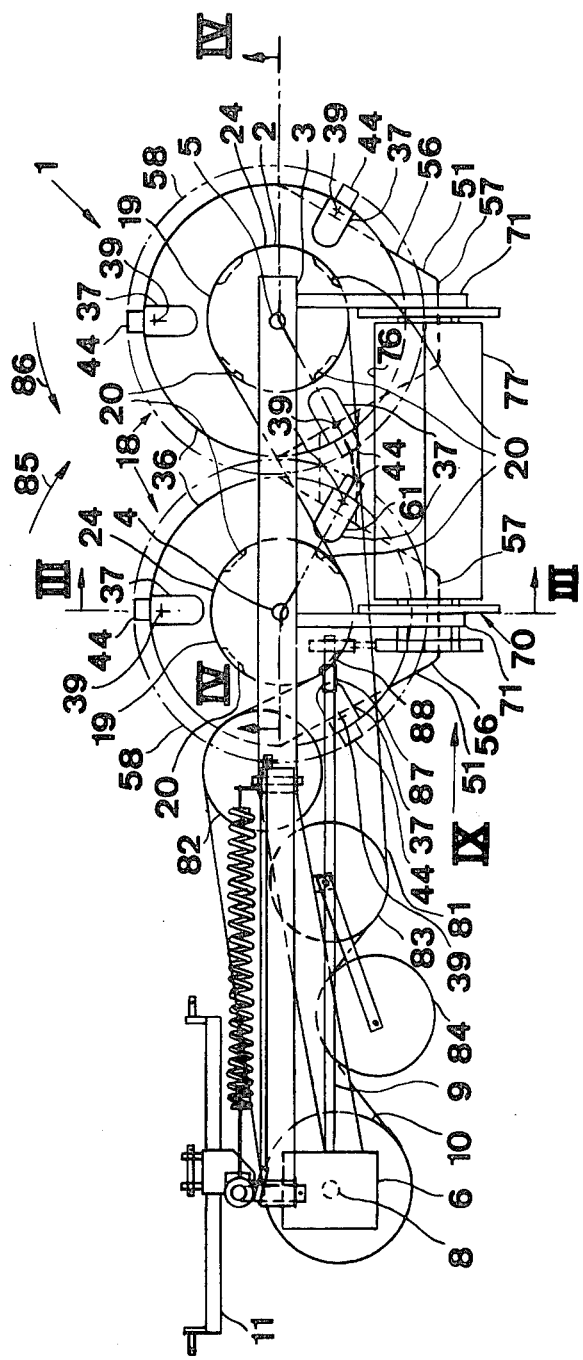
FIG. 2 is a plan view of the mower-conditioner shown in FIG. 1.

With reference to FIGS. 1 to 4, the mower-conditioner is of the tractor-mounted type and is indicated generally at 1 and comprises a chassis 2 having a transversally-extending main upper beam 3 having two spaced, downwardly-extending identical hollow spindles 4 and 5 jounralled therein towards one end. The other end of the main beam 3 projects behind a tractor (not shown) when the mower-conditioner is mounted thereon and supports gearbox 6 with a forwardly-projecting input shaft 7 and a pair of output shafts 8 and 9. The output shaft 8 extends downwardly, supporting a V-pulley 10 while the other output shaft 9 extends generally horizontally and parallel to the main beam 3 in a direction towards conditioner means.

The main beam 3, being pivotally attached to a main frame 11 for connection to a tractor's 3-point linkage (not shown), is welded to a pair of bushings 12 for receiving the spindles 4 and 5 therein, the spindles being slightly offset heightwise and welded, or otherwise fixedly secured, to the bushings. Stub shafts 13 are welded to the lower ends of the hollow spindles 4 and 5 and are provided with threaded axial bores 14. The stub shafts 13 are adapted to receive lower bearings 15 against the collars 16 and these bearings, together with upper bearings 17 on the bushes 12, rotatably support respective mower units generally indicated at 18.

Each mower unit 18 comprises a generally cylindrical body 19 made of sheet metal. With special reference to FIG. 6, it will be seen that each cylindrical body 19 comprises relatively narrow and shallow indentations 20 which extend axially, and over the total height, of the body 19. Each cylindrical body 19 is made of two halves 21,22 which are bolted or otherwise secured to each other. Two of the indentations 20 are provided at the joints 23 so that the components used to secure the halves together are positioned within the indentations and are thereby shielded to some extent.

A V-pulley 24 is welded to the top end of the cylindrical body 19 and supports an inner race 25 of the bearing 17. The lower half of the pulley is extended to provide an annular shield 26. A mounting piece 27 of the particular shape shown in FIG. 7 is welded to the lower end of the cylindrical body 19, the mounting piece 27 comprising apertures 28,29 and weld nuts 30,31 (FIGS. 3 and 4) aligned therewith. Bearing races 32,33 for the bearings 15 are secured to each cylindrical body 19 by bolts 34 which cooperate with the weld nuts 31 on the mounting piece 27.

Figure 3:
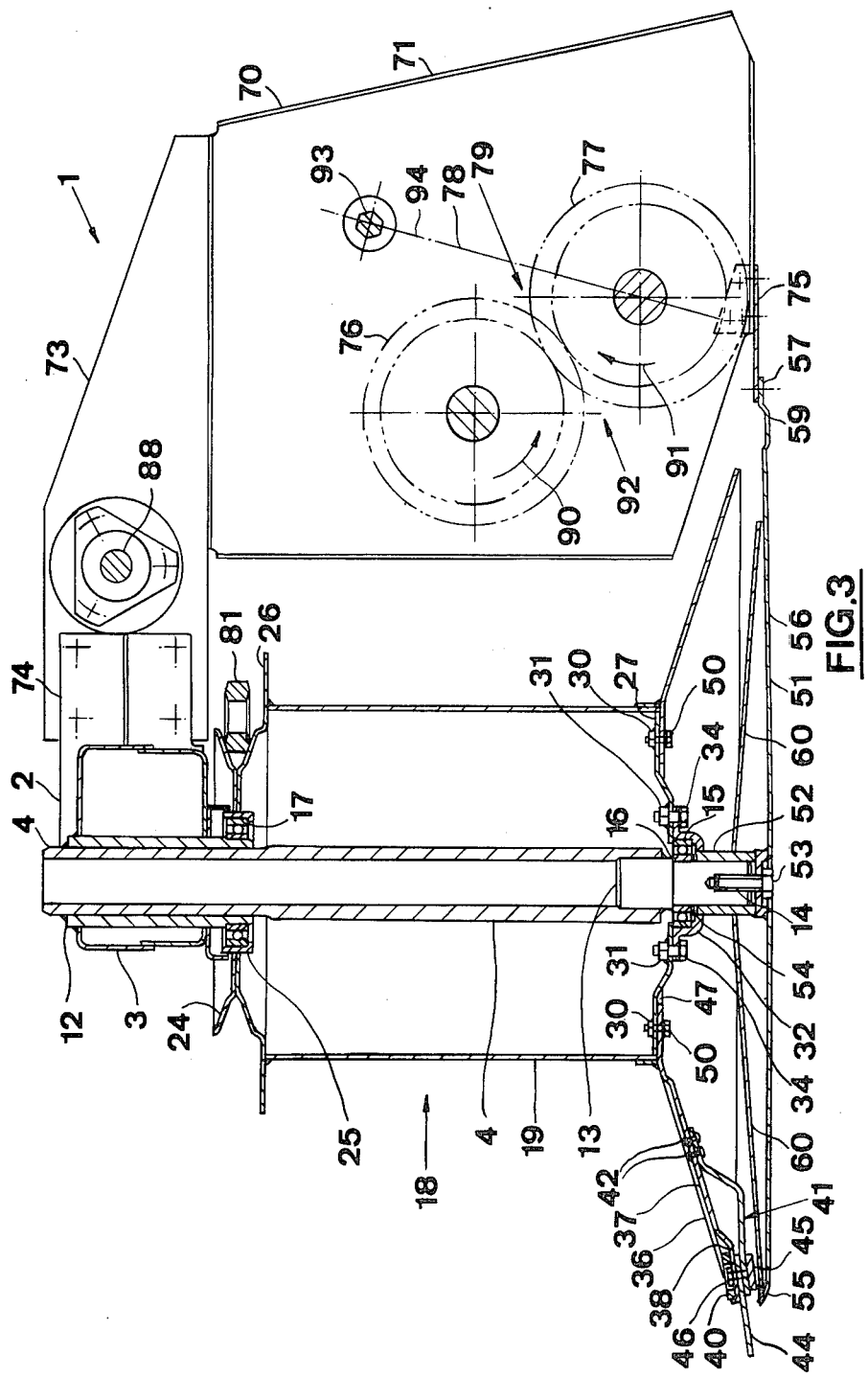
FIG. 3 is a section to a larger scale, on the line III—III of FIG. 2.

Each mower unit 18 further comprises a frusto-conical mower flange 36 with radially extending, elongated relatively shallow and narrow indentations 37. The indentations or recesses 37 comprise a deeper section 38 adjacent the periphery of the mower flange and having an aperture 39 therein (FIG. 3). Protective rings 40 are welded to the upper side of the mower flange 36, concentrically with the apertures 39 (FIG. 8) and cutter blade mounting means 41 are secured to the underside of the mower flanges 36 by bolts 42 located within associated indentations 37. Cutter blades 44 are pivotally attached to the mower units 18 via bolts 45 projecting through the cutter blade mounting means 41 and the apertures 39 and secured to the mower flanges 36 by nuts 46 positioned within the protective rings 40.

The mower flanges 36 have a central aperture 47 (FIG. 6) of a particular shape which complements the periphery of the mounting piece 27 so that each mounting piece 27 and mower flange 36 can be made of a single piece of metal. This piece of metal is first shaped by a press and then the formed blank is sheared into two separate components as shown. By rotating the components in an opposite direction, the portions 48 and 49 of the mounting piece 27 and flange 36, respectively, will overlap each other so that the mower flanges 36 can be secured to the mounting pieces 27 and hence to the lower ends of the cylindrical bodies 19 by bolts 50 cooperating with the weld nuts 30.

Figure 4:
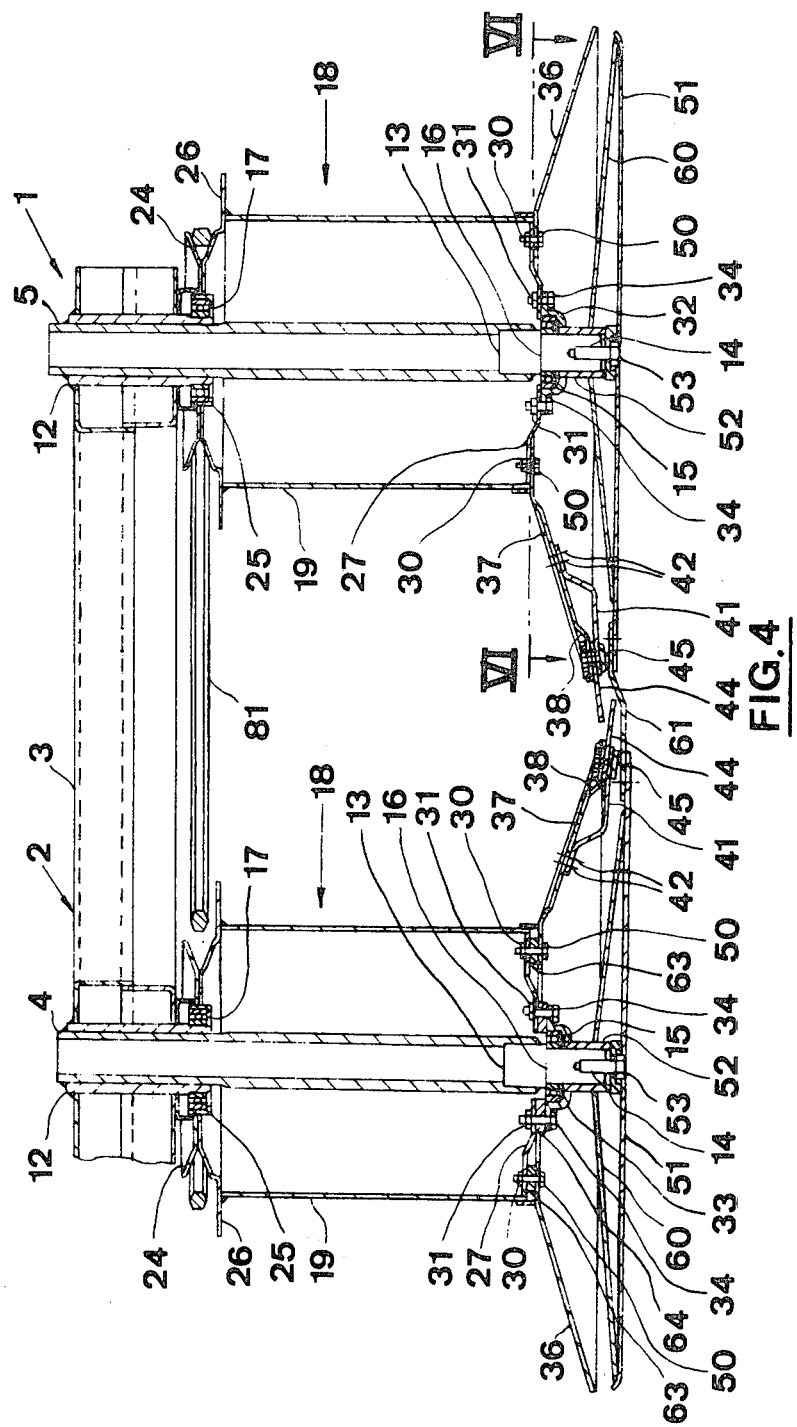
FIG. 4 is a section, to a larger scale, on the line IV—IV of FIG. 2 with certain components removed for clarity.

Stationary, almost entirely flat, ground-engaging skids 51, having bushings 52 for mounting on respective stub shafts 13 are secured to the stub shafts 13 by bolts 53 cooperating with the threaded bores 14. Spacers 54 (FIG. 3) are inserted between the bushings 52 and the inner bearing races of the bearings 15. Each side has a semi-circular upturned forward edge 55 generally parallel to, and spaced below, the corresponding forward edge of the mower flange 36. The rear section 56 of each skid 51 is generally triangular in plan view (FIG. 5) and comprises a rear portion 57 extending beyond the rear edge of the associated cutter path indicated at 58 in FIG. 6. Each section 56 is included slightly upwardly in a rearward direction and comprises an arcuate recess 59 below the cutter path 58. Each skid 51 comprises reinforcing members 60 welded to the upper side thereof. Adjacent stationary skids 51 are connected together by a link 61 which, as can be seen in FIG. 4, is cranked to accommodate the staggered heights of the skids.

The upper V-pulleys 24 of the mower units 18 extend at the same height while the corresponding mower flanges 36 ae slightly staggered in height so that the cutter paths 58 can overlap each other without the cutters fouling each other. Therefore, while the mower flange 36 associated with the spindle 5 is attached directly to the mounting piece 27 at the lower end of the cylindrical body 19, the mower flange 36 associated with the spindle 4 is secured to the associated mounting piece 27 of the cylindrical body 19 with the interposition of a spacer 63. Also, while the inner races of the bearings 15 abut the respective collars 16, the bearing race 32 is mounted directly on the mounting piece 27 and the bearing race 33 is mounted on the associated mounting piece 27 with the interposition of another spacer 64.

A conditioner sub-frame 70 with side walls 71 is mounted on the mower structure via upper extensions 73 which are bolted to brackets 74 on the transverse beam 3, and via lower brackets 75 extending between and interconnecting the rear ends 57 of the skids 51 on the one hand and the subframe 70 on the other hand. The side walls 71 partially project above the rear sections of the mower flanges 36 and have an upper conditioner roll 76 positioned transversely above the mower flanges 36 and rearwardly of the cylindrical bodies 19. A further conditioner roll 77 is cooperable therewith and is mounted below and rearwardly of the first roll 76 on a rocking frame 78 which itself is pivoted to the conditioner sub-frame 70 at a location above a discharge nip 79 of the conditioner rolls 76,77.

The rocking frame 78 comprises a torsion bar 93 (FIG. 9) pivotally mounted on the sub-frame 70 and a pair of arms 94 securely attached at one of their ends to respective opposed ends of the torsion bars 93 and supporting at their other ends the conditioner roll 77. The lower roll 77 can pivot towards and away from the first roll 76 about the axis of the torsion bar 93 in response to the layer of crop material fed therebetween. Spring means 80 urge the lower roll 77 towards the upper roll 76. If one side of the conditioner means tends to open in advance of the other, due to inconsistent crop flow, then the torsion bar 93 will impose a load on the other arm 94 forcing it to move, thus ensuring as far as possible that the rolls 76 and 77 remain parallel. This action is dependent on the stiffness of the torsion bar 93 fitted.

A hexagonal belt 81 extends around the V-pulley 10 on the gearbox 6, the pulleys 24 on the mower units 18, and around tension pulleys 82,83,84 of which pulley 94 is spring loaded, so as to drive the adjacent mower units 18 in opposite directions 85,86. The transversely-extending output shaft 9 is coupled via a flexible coupling 87 to a shaft 88 mounted on the conditioner sub-frame 70 which is drivingly coupled to the conditioner rolls 76,77 via a chain transmission generally indicated at 89. The chain transmission 89 comprises a single chain 95 extending from a drive sprocket 96 on the shaft 88 over two driven conditioner roll sprockets 97,98. A spring-loaded idler 99 is provided to complete the drive line. A chain guide 100 is provided on the sprocket 97 to prevent the drive chain 95 jumping off the sprocket 97 and causing incorrect roll timing.

In operation, the mower-conditioner is brought from its transport position generally rearwardly of a tractor to its transverse operative position to one side of the tractor. The structure is lowered so that the skids 51 contact the ground surface end the drive means are engaged to drive the mower units 18 in the directions 85,86, and the conditioner rolls 76,77 in the directions 90,91. The drive speed of the cutter units 18 is relatively high and is preferably of the order of 80 meters per second at the outer circumference of the flanges 36. The cutter blades 44 hit the stems of the crop which are therby cut by impact. After being cut, the mower flanges 36 move below the butt ends of the cut crop and aided by radial indentations 37 in the mower flanges 36, together with the indentations 20 in the cylindrical bodies 19, deflect the cut crop towards the central area between the two mower units 18 of a pair for conveying the crop therebetween, in rearward direction. The crop thus conveyed in a rearward direction between neighboring mower units 18 is fed directly to the intake nip 92 of the conditioner rolls 76,77 without first being deposited on the ground. The intermeshing conditioner rolls 76,77 effect an aggressive grasp on the crop and pull it between them and squeeze it as it passes therethrough. As material passes through the conditioner rolls 76,77 the lower roll 77 pivots rearwardly if the crop thickness so demands, the pivot center 93 being above and slightly rearwardly of the normal position of the lower roll 77 as seen in FIG. 3. The system insures that the drive chain 95 cannot jump off the upper roll sprocket 97 as the lower roll moves away to allow material to pass through between the rolls 76,77. The conditioner rolls 76,77 finally discharge the conditioned crop material onto the ground in a fluffy windrow ready for drying.

The indentations 20,37 in the cylindrical bodies 19 and the mower flanges 36 reduce the risks of material wrapping on the mower units 18 and thus the components located therein are likely to be subjected to less wear and distortion than in known machines. Hence, balance of the mower units 18 is better maintained. Furthermore, the provision of the crop conveyor indentations 20,37 results in improved strength and stability of the mower unit 18. Finally, manufacturing is very much simplified as many components are produced from sheet metal requiring simple press and shearing operations.

Thus the mower-conditioner is of a simple construction with a good spread of the bearings 15,17 of the mower units 18, and with V-pulleys 24 incorporated in the drum design. The upper transverse beam 3, the spindles 4,5 the fixed skid shoes 51 and the brace or link 61 provide a rigid rectangular framework for mounting the mower units thereon. This rigid structure prevents the usual distortion problems encountered with cantilever type constructions. The upper beam 3 and the rear ends of the skid shoes 51 also provide readily available rigid upper and lower mounting points on the mower structure, such as for the conditioner means, so that cantilevered mountings of such components as well as the mower units themselves can be avoided. This results in a more stable arrangement with less stress in the critical areas of the framework. This framework is equally less subject to distortion as a result of hard objects passing between the mower units. Hence less vibrations due to unbalances will hamper the operation of the machine. The drive arrangement for the mower means and also the conditioner means is very simple. Indeed, a quiet, single V-belt drive has been provided which is very simple in operation, adjustment, manufacture and service. Furthermore, there is only one gearbox for driving both the mower and conditioner. The rocking frame 78 supporting the lower conditioner rolls 77 and the side walls 71 and causes the latter to open parallel, or nearly parallel, even when unevenly loaded. This gives a better drive chain alignment resulting in less wear on the drive chain and sprocket 89. The torsion bar 93 helps to absorb shock loads. The conditioner drive means is a very simple single chain drive system resulting, for example, in easy adjustments. The spring loaded chain idler automatically maintains the correct chain tension and finally, the chain guide 100 insures the correct roll timing.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A mower-conditioner comprising:
   (a) a chassis including an upper transversely extending rigid beam member;
   (b) stationary ground engageable skid means connected via frame members to said beam;
   (c) one or more drum type mower units mounted for rotation between said upper transversely extending beam and said stationary ground engageable skid means;
   (d) said mower units each comprising a substantially cylindrical body portion, an annular flange extending from the vicinity of the lower end of said main body portion, and at least one cutter blade for cutting standing crop by impact under conditions where the mower units are rotated;
   (e) drive means for rotating said drum mower units; and
   (f) crop conditioner means mounted rearwardly of the mower units and between the upper beam and the rear of said skid means for receiving severed crop material as it is being conveyed rearwardly by the mower units, said conditioner means including two intermeshing generally horizontal rolls with one roll mounted for movement towards and away from the other roll about an axis located above and rearwardly of said one roll when the latter is in the normal operating position, said axis being defined by a torsion bar, the ends of which are interconnected with the respective ends of said one roll by arms, means being provided for urging said one roll towards said other roll, the mower units being operable to deliver crop material directly to the conditioner rolls.

2. A mower-conditioner according to claim 1, wherein said drive means includes a gearbox at one end of said beam, the gearbox having an input shaft connectable to power means, a first output shaft operable to drive said mower units through a belt drive arrangement and a second output shaft operable to drive the conditioner means.

3. A mower-conditioner according to claim 2 wherein the second output shaft drives the conditioner means through a chain drive arrangement.

4. A mower-conditioner according to claims 1, 2 or 3 wherein two mower units are provided, said skid means comprise first and second substantially flat skids rigidly connected in side-by-side fashion, and the conditioner means are mounted on said frame members comprising side walls attached to the respective rear ends of said flat skids of the mower units, which frame members are attached to the upper transverse beam via extensions interconnecting the side walls and the upper beam.

5. A mower-conditioner comprising:
   (a) a chassis including an upper transversely extending rigid beam member;
   (b) stationary ground engageable skid means connected via frame members to said beam;
   (c) one or more drum type mower units mounted for rotation between said upper transversely extending beam and said stationary ground engageable skid means;
   (d) said mower units each comprising a substantially cylindrical body portion, an annular flange extending from the vicinity of the lower end of said main body portion, and at least one cutter blade for cutting standing crop by impact under conditions where the mower units are rotated;
   (e) drive means for rotating said drum mower units, and
   (f) crop conditioner means mounted rearwardly of the mower units for receiving severed crop material as it is being conveyed rearwardly by the mower units, said conditioner means being attached to said upper beam and to the rear of said skid means such that said conditioner means is operably positioned between said upper beam and said skid means in a rigid relationship thereto.

* * * * *